United States Patent [19]

Fujimoto et al.

[11] Patent Number: 5,468,571
[45] Date of Patent: Nov. 21, 1995

[54] SECONDARY BATTERY

[75] Inventors: Masahisa Fujimoto; Koji Nishio, both of Osaka; Toshihiko Saito, Tsuzuki, all of Japan

[73] Assignee: Sanyo Electric Co., Ltd., Osaka, Japan

[21] Appl. No.: 412,230

[22] Filed: Mar. 27, 1995

Related U.S. Application Data

[63] Continuation of Ser. No. 106,621, Aug. 16, 1993, abandoned.

[30] Foreign Application Priority Data

Nov. 19, 1992 [JP] Japan .................. 4-335659

[51] Int. Cl.$^6$ .................. H01M 4/62; H01M 4/58
[52] U.S. Cl. .................. 429/217; 429/218
[58] Field of Search .................. 429/217, 218

[56] References Cited

U.S. PATENT DOCUMENTS

| | | |
|---|---|---|
| 4,294,893 | 10/1981 | Iemmi et al. .................. 429/217 X |
| 4,369,104 | 1/1983 | Beckley .................. 429/44 X |
| 4,497,883 | 2/1985 | Murray . |
| 4,814,242 | 3/1989 | Maxfield et al. . |
| 4,959,281 | 9/1990 | Nishi et al. . |

FOREIGN PATENT DOCUMENTS

| | | |
|---|---|---|
| 409192 | 1/1991 | European Pat. Off. . |
| 460617 | 12/1991 | European Pat. Off. . |
| 510236 | 10/1992 | European Pat. Off. . |
| 38130 | 3/1977 | Japan .................. 429/217 |
| 2-66856 | 3/1990 | Japan . |
| 3-93162 | 4/1991 | Japan . |

OTHER PUBLICATIONS

Patent Abstracts of Japan & JP-A-57 210 568 (Sanyo Denki KK), vol. 7, No. 62 (E-164) 24 Dec. 1982.
Chemical Abstracts; Jobst, Konrad 'Binder For Electrodes, Especially Polymer Electrodes', and DD-A-280 853, Abstract No. 85373u, vol. 114, No. 10, p. 208, 11 Mar. 1991.

*Primary Examiner*—John S. Maples
*Attorney, Agent, or Firm*—Birch, Stewart, Kolasch & Birch

[57] ABSTRACT

Provided is a secondary battery with a negative electrode comprising a carbon powder capable of occluding and discharging cations, particles constituting the powder being consolidated with a binder, the binder consisting essentially of a polyimide or polyvinyl formal resin. In this battery, carbon particles are sufficiently consolidated and, are also adhered firmly to the negative electrode collector metal so that they hardly peel off from the negative electrode. As a result, the battery hardly decreases its capacity even when charge-discharge cycles are repeatedly run, thereby having a long cycle life. Furthermore, since the binder for the negative electrode comprises PI or PVF, containing no fluorine, there is little danger of the battery bursting or breaking even when the battery temperature becomes abnormally high, whereby the battery has high reliability.

4 Claims, 4 Drawing Sheets

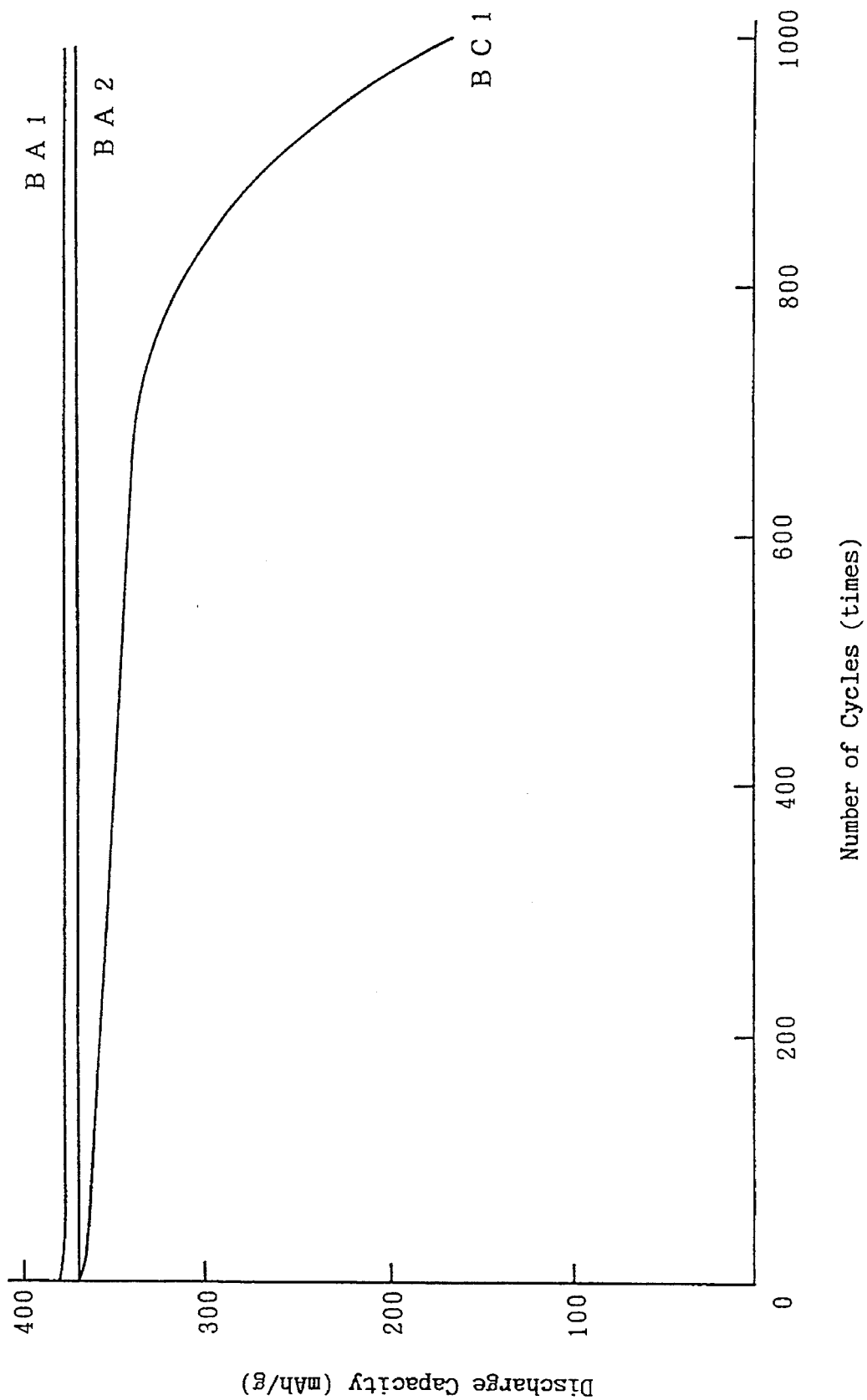

SECONDARY BATTERY

This application is a continuation of U.S. application Ser. No. 08/106,621 filed on Aug. 16, 1993, now abandoned.

BACKGROUND OF THE INVENTION

This application claims the priority of Japanese Patent Application No. 4-335659 filed Nov. 19, 1992, which is incorporated herein by reference.

1. Field of the Invention

The present invention relates to a secondary battery and, more specifically, to improvement of the binder used therefor in order to improve the cycle life and reliability (safety) thereof.

2. Description of the Prior Art

In recent years, there have been proposed, as negative electrode materials for lithium secondary batteries, carbon materials such as coke and graphite, in replacement of conventional metallic lithium, on the grounds of high flexibility and no danger of precipitating mossy lithium.

Negative electrodes utilizing the above carbon materials are generally prepared by, for example, a process which comprises making a slurry by dispersing a carbon powder (such as graphite or coke powder) and, as required, a conductive agent powder (such as acetylene black or carbon black) in a binder solution, applying the thus obtained slurry on a collector metal and drying the slurry on the metal.

As the binder solution, there has been principally used a solution of PVDF (polyvinylidene fluoride) in NMP (N-methyl-2-pyrrolidone).

However, although PVDF is excellent as a binder to consolidate carbon particles, it is poor in adhesiveness (close fittability) with collector metals. As a result, when charge-discharge is conducted repeatedly, the carbon powder used peels off from the collector metal such as copper plate or copper foil, thereby gradually decreasing battery capacity. That is, batteries utilizing PVDF have had the problem of more or less short cycle life.

Besides, when the battery temperature becomes abnormally high due to short-circuit or like accidents, PVDF decomposes to generate HF (hydrogen fluoride), which reacts vigorously exothermically with $C_6Li$ having generated on the negative electrode during charge so that the battery may break or burst. Thus, the batteries utilizing PVDF have had problems with respect to reliability.

SUMMARY OF THE INVENTION

The present invention has been completed in consideration of the above and, accordingly, an object thereof is to provide a highly reliable secondary battery that has long cycle life and resists breaking or bursting even when its temperature becomes abnormally high.

Thus, the present invention provides a secondary battery having a negative electrode comprising a carbon powder capable of occluding and discharging cations, particles constituting the carbon powder being consolidated with a binder, the binder consisting essentially of a polyimide resin (hereinafter this battery is referred to as "battery No. 1").

The present invention also provides a secondary battery having a negative electrode comprising a carbon powder capable of occluding and discharging cations, particles of the powder being consolidated with a binder, the binder consisting essentially of a polyvinyl formal resin (hereinafter this battery is referred to as "battery No. 2").

In the battery of the present invention, carbon particles are sufficiently consolidated and are also adhered firmly to the negative electrode collector metal so that they resist peeling off from the negative electrode. As a result, the battery hardly decreases its capacity even when charge-discharge cycles are repeatedly run, thereby having a long cycle life. Furthermore, since the binder for the negative electrode comprises PI or PVF, containing no fluorine, there is little danger of the battery bursting or breaking even when the battery temperature becomes abnormally high, whereby the battery has high reliability.

The batteries No. 1 and No. 2 are hereinafter sometimes generically referred to as "the batteries of the present invention".

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 4 is a graph showing the cycle characteristics of the batteries of the present invention and a comparison battery.

DETAILED DESCRIPTION OF THE PREFERRED EMBODIMENTS

Figure 1:
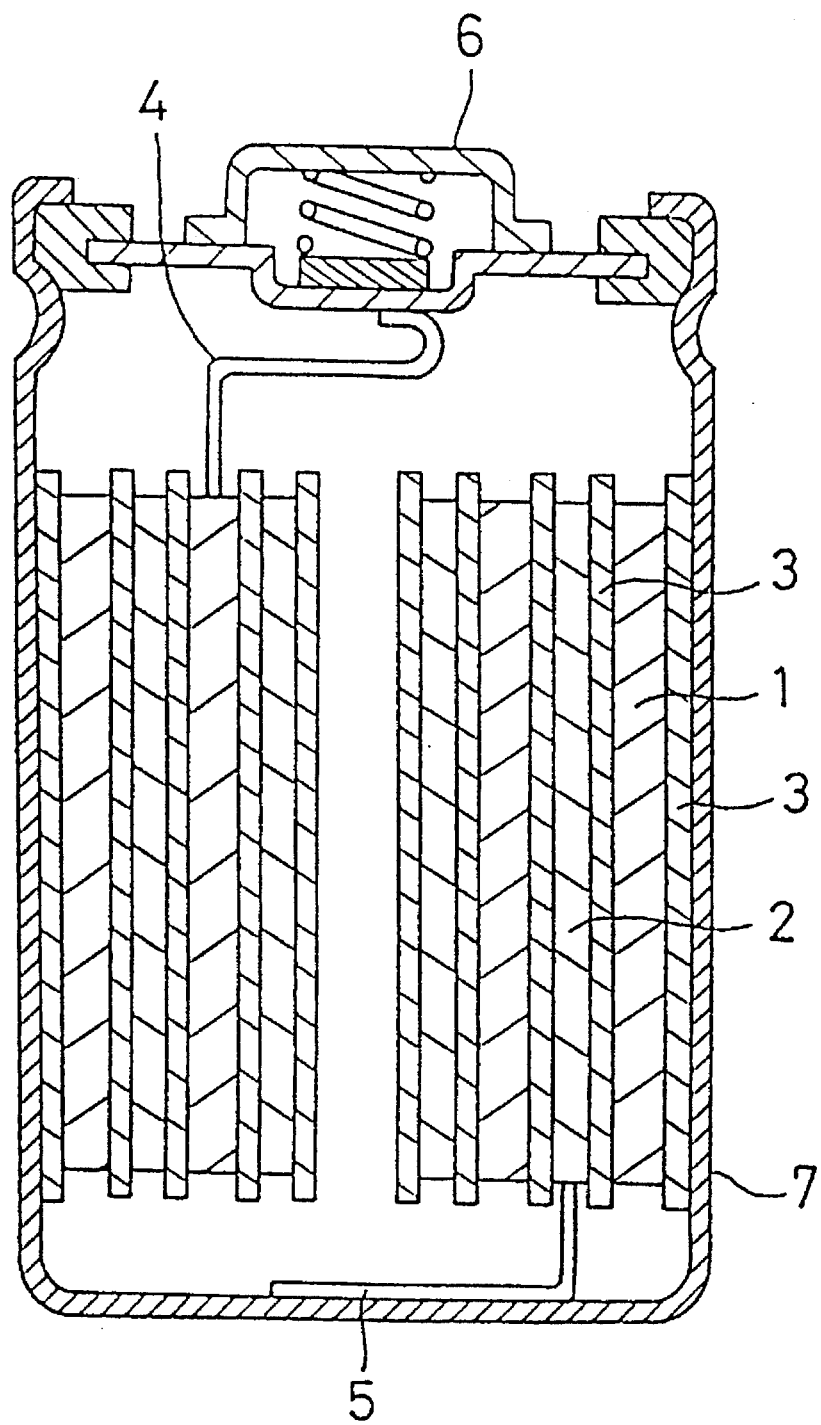
FIG. 1 is a cross-sectional view of a cylindrical type of the battery No. 1 BA1.

Examples of the carbon powder capable of occluding and discharging cations and used in the present invention are coke, preferably purified coke having a purity of at least 99%, organic baked products obtained by baking cellulose and the like, graphite and glassy carbon. These carbon powders, may be used alone or, if necessary, in combination of 2 or more. Among these carbon powders, graphite is preferred because of its high capacity of occluding and discharging lithium.

Among various types of graphite those having the following characteristics are particularly preferred.

① Average particle diameter: 1 to 30 μm
② d-value ($d_{002}$) of lattice plane (002) in X-ray diffraction pattern: 3.35 to 3.40 Å
③ The crystal size (Lc) in the c-direction in X-ray diffraction pattern: at least 150 Å
④ Specific surface area obtained by BET method: 0.5 to 50 $m^2/g$
⑤ True density: 1.9 to 2.3 $g/cm^3$.

Examples of cations as referred to in the present invention are $Li^+$ (lithium secondary battery), $Ba^{2+}$, $Sr^{2+}$, $Ca^{2+}$, $Mg^{2+}$ and $Al^{3+}$.

In the present invention, as the binder to consolidate the above carbon powder, PI (polyimide resin) and PVF (polyvinyl formal resin) are used for the batteries No. 1 and No. 2, respectively.

The use of PI or PVF instead of conventional PVDF is based on the following grounds (1) and (2).

(1) Both PI and PVF are not only excellent, like PVDF, in the binding force for carbon particles with each other, but markedly superior to PVDF in adhesiveness to negative electrode collectors (such as copper).

(2) Both PI and PVF, differing from PVDF which is one of fluororesins, contain no fluorine in their molecules, and hence are in no danger of breaking or bursting even when the battery temperature becomes abnormally high.

The PI in the battery No. 1 may either be a thermo-setting polyimide or a thermoplastic polyimide, the former including both condensation type and addition type, insofar as it exerts high strength to bond carbon particles with each other and good adhesiveness to the collector metal used.

A representative example of condensation type polyimide resins is one obtained by heat curing (dehydration condensation reaction) a solution of a polyamide acid (a polyimide intermediate) in N-methyl-2-pyrrolidone by the reaction formula shown below, the polyamide acid in turn being obtained by reacting an aromatic diamine with an aromatic tetracarboxylic acid anhydride.

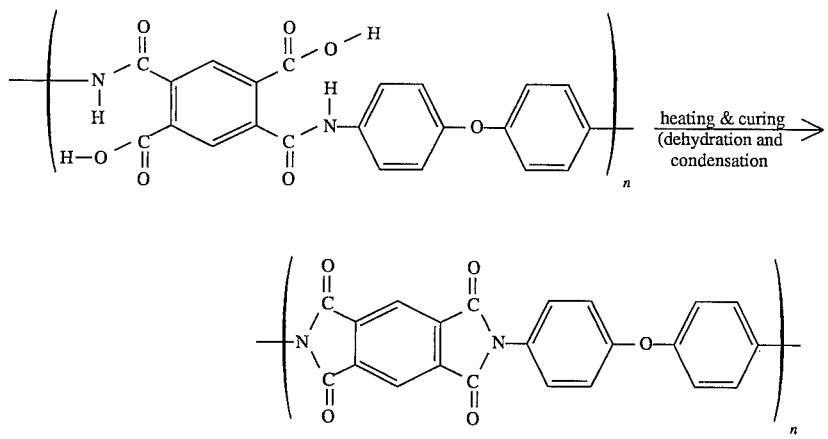

The heat curing is preferably conducted at a temperature of at least 350° C. for at least 2 hours, to complete dehydration condensation reaction. Otherwise, if the polyimide intermediate with which dehydration condensation reaction has not been completed remains in the negative electrode after the heat curing, it may, when the battery temperature becomes abnormally high, condense to release water, which should react vigorously with lithium.

A representative example of addition type polyimides is one obtained by heat curing (addition reaction) by the reaction formula shown below an aromatic diamine and a bis-maleimide synthesized from maleic anhydride and a diamine.

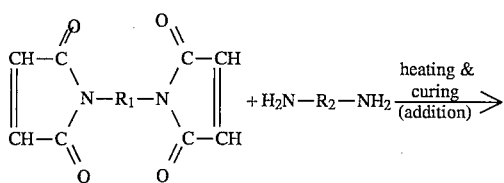

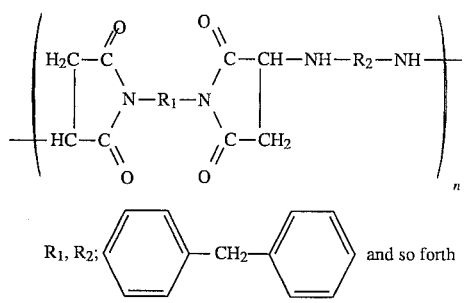

Examples of desirable, commercially available PI are VESPEL (Registered Trade Mark) from du Pont, UPILEX (Registered Trade Mark) from Ube Industries, Ltd., PIQ (Registered Trade Mark) and PIX (Registered Trade Mark) from Hitachi Chemical Co., Ltd., LARC-TPI (Registered Trade Mark) from Mitsui Toatsu Chemicals, Inc. (these are condensation type linear polyimides) and ULTEM (Registered Trade Mark)(a polyetherimide, which is thermoplastic).

PI exerts good binding and adhering properties even when used in a small amount and, hence, is generally used at least 0.5 part by weight, usually about 1 part by weight, based on 100 part by weight of the carbon powder used. An excess of PI will, as shown in Examples to be described later herein, cause a capacity decrease, so that the amount of PI is preferably not more than 2 parts by weight.

Any PVF can be used for the battery No. 2, as long as it is excellent in binding and adhering properties. PVF can readily be obtained by dissolving PVA (polyvinyl alcohol) in water, methanol or like solvents and conducting formalization (condensation reaction) in the presence of an inorganic acid catalyst such as hydrochloric acid or sulfuric acid.

Since PVF is a little inferior to PI in the binding force for carbon particles and adhesiveness with collector metals, it is preferably used in an amount of at least 5 parts by weight based on 100 parts by weight of the carbon powder used. Here also, an excess PVF causes a capacity decrease, and hence the amount of PVF is preferably not more than 10 parts by weight.

The negative electrode used in the present invention is prepared by, for example, a process which comprises mixing a solution of PI or PVF in an organic solvent such as NMP with a carbon powder and, if necessary, a conducting agent powder to prepare a slurry, applying the obtained slurry on a collector metal using doctor blade, drying the slurry on the metal to evaporate off the organic solvent and heat curing the remaining resin.

In the preparation of the battery No. 1, it is desirable to use a slurry prepared by dispersing a carbon powder in a solution of a PI intermediate, which realizes a secondary battery having long cycle life.

Examples of active materials for preparing positive electrodes when the present invention is applied, for example, to lithium secondary batteries are oxides having tunnel-like pores, such as $TiO_2$ and $V_2O_5$; metal charcogens having layer structure, such as $TiS_2$ and $MoS_2$ and Li-containing composite oxides represented by $Li_xMO_2$ and $Li_yM_2O_4$ (M denotes a transition element; $0<X\leq1$, $0<Y\leq2$). Concrete examples of the Li-containing composite oxides are $LiCoO_2$, $LiMnO_2$, $LiNiO_2$, $LiCrO_2$ and $LiMn_2O_4$.

These positive electrode materials are also used for preparing positive electrodes generally after being kneaded with a binder and, as required, a conductive agent such as acetylene black or carbon black. The binder used for positive electrode is also preferably PI or PVF to increase adhesiveness between the collector metal and active material used.

The battery of the present invention, utilizing a binder of PI or PVF replacing conventional PVDF, provides good bonding among carbon particles and also good adhesion between carbon particles and negative electrode collector metal. Repeated charge-discharge cycles with the battery therefore barely cause little of the carbon particles to peel from the negative electrode collector so that the battery capacity barely decreases.

Furthermore, since the binder contains no fluorine, there is no danger of bursting or breakage of the battery due to reaction of $C_6Li$ with hydrogen fluoride that could form by thermal degradation of the binder, which has been a serious problem with conventional lithium secondary batteries.

Other features of the invention will become apparent in the course of the following descriptions of exemplary embodiments which are given for illustration of the invention and are not intended to be limiting thereof.

EXAMPLE 1

Preparation of positive electrode

A slurry was prepared by dispersing $V_2O_5$ as a positive electrode active material and acetylene black as a conductive agent in a 1% by weight solution of a PI (TORAYNEECE #3000 made by Toray Industries, Inc., a polycondensation type PI) in NMP. The slurry thus prepared was applied by doctor blade method on one surface of an aluminum foil as a positive electrode collector. The foil was dried under vacuum at 60° C. to evaporate off NMP. The slurry was again applied on the other surface of the foil, which was then dried under the same conditions.

The foil was then heat treated at 350° C. for 2 hours, to give an electrode. The weight ratio between $V_2O_5$, acetylene black and PI was 93:5:2.

The electrode thus prepared was used as a positive electrode and, with a negative electrode of a lithium electrode and an electrolyte solution of 1 mole/liter $LiPF_6$ in a 1/1 by volume mixed solvent of ethylene carbonate and dimethyl carbonate, discharge was conducted to prepare a positive electrode comprising $V_2O_5$ having occluded lithium in its pores.

Preparation of negative electrode

A slurry was prepared by dispersing graphite in a 1% by weight PI solution in NMP as a binder solution. The obtained slurry was applied by doctor blade method on both surfaces of a copper foil as a negative electrode collector. The foil was dried and heat treated under the same conditions as for the above positive electrode, to give a negative electrode. The ratio by weight of graphite and PI was 100:1.

Preparation of electrolyte solution $LiPF_6$ was dissolved to a concentration of 1 mole/liter in a 1/1 by volume mixed solvent of ethylene carbonate and dimethyl carbonate.

Preparation of battery No. 1

A cylindrical battery No. 1 (size: diameter=14.2 mm, length=50.0 mm) according to the present invention was prepared using the positive and negative electrodes and electrolyte solution prepared above. The separator used was a thin microporous polypropylene film having ion permeability (CELGARD 3401 made by Polyplastics Co., Ltd.).

FIG. 1 is a cross-sectional view of the cylindrical type battery No. 1 BA1 thus prepared, which comprises the positive and negative electrodes 1 and 2, the separator 3, a positive electrode lead 4, a negative electrode lead 5, a positive electrode external terminal 6 and a negative electrode can 7. The positive and negative electrodes 1 and 2 are housed in the negative electrode can 7, while being spirally wound via the separator 3. The positive electrode 1 is connected, via the positive electrode 4, to the positive electrode external terminal 6, and the negative electrode 2 to the negative electrode can 7 via the negative electrode lead 5, so that chemical energy that generates inside the battery No. 1 BA1 can be taken out as electric energy.

EXAMPLE 2

The procedure of Example 1 was followed except that a 2.5% by weight PVF (VINILEC 330 made by Chisso Corporation) in NMP was used as a binder solution for preparing positive and negative electrodes, to prepare a battery No. 2 BA2 according to the present invention. The ratio by weight of $V_2O_5$, acetylene black and PVF in the positive electrode was 90:5:5 and that of graphite and PVF in the negative electrode was 100:5.

Comparative Example 1

The procedure of Example 1 was followed except that a 2.5% by weight PVDF in NMP was used as a binder solution, to prepare a comparison battery BC1. The ratio by weight of $V_2O_5$, acetylene black and PVDF in the positive electrode was 90:5:5 and that of graphite and PVDF in the negative electrode was 100:5.

Peeling strength

Negative electrodes were prepare with various types and amount of binders. An adhesive tape was patched on the surface of each of the negative electrodes. One of the ends of the tape was mounted on a spring balance and the balance was pulled. The tensile load at which the carbon powder peeled was recorded as the peeling strength of the negative electrode tested. The surface resistance of each of the negative electrodes was also tested. The results are shown in FIG. 2 and Table 1.

TABLE 1

| Battery | Amount of binder (based on 100 parts by weight of graphite) | Peeling strength (kg/cm$^2$) | Surface resistance ($\Omega$) |
|---|---|---|---|
| No. 1 BA1 | PI 1 part by weight | 1.80 | 0.2 |
| No. 2 BA2 | PVF 5 parts by weight | 2.10 | 0.5 |
| Comparison BC1 | PVDF 5 parts by weight | 0.13 | 2.4 |

Figure 2:
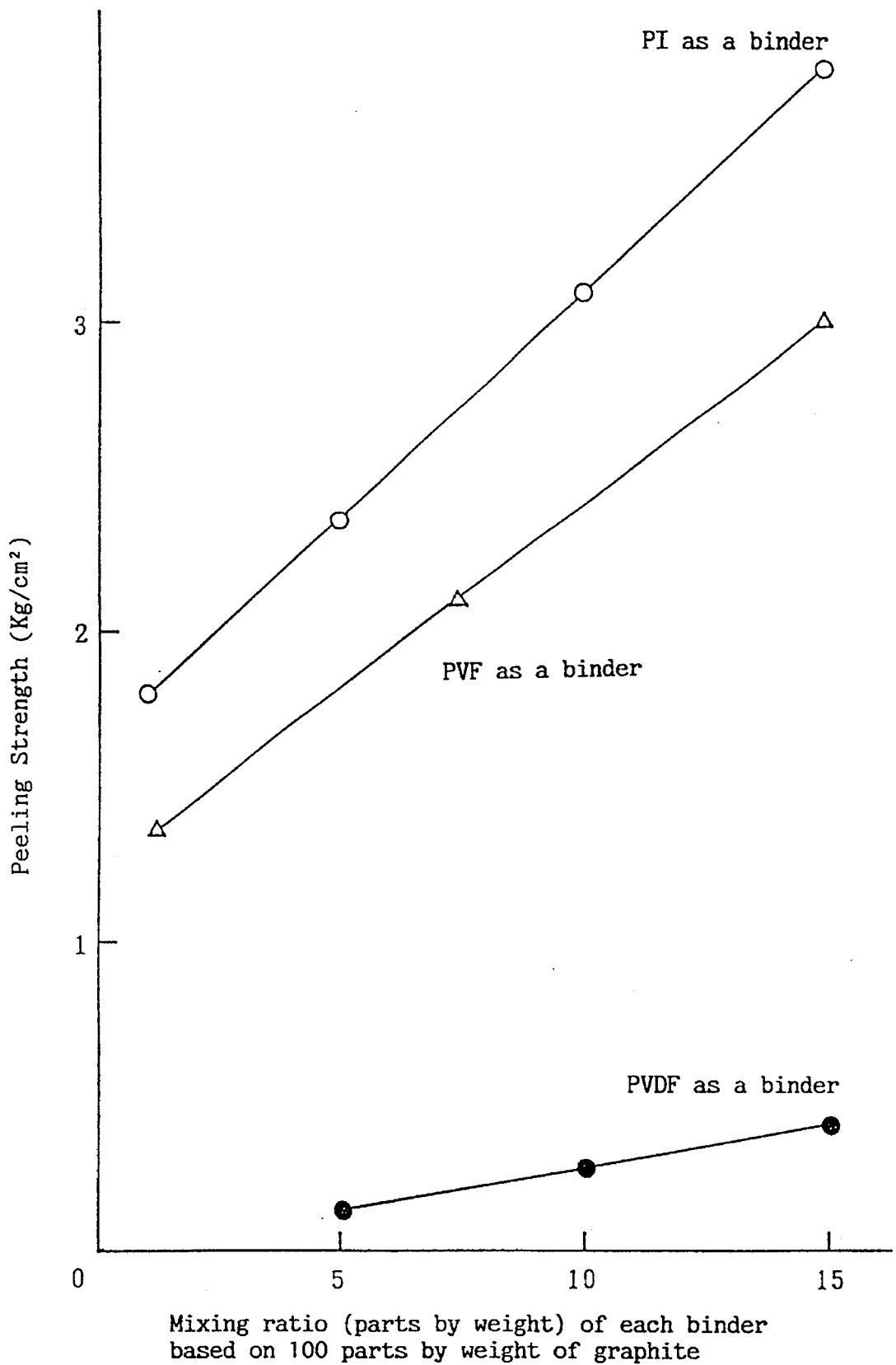
FIG. 2 is a graph showing the relationship between the type and amount of the binder used and the peeling strength of carbon powder of the negative electrode.

FIG. 2 is a graph with the ordinate representing the peeling strength (kg/cm$^2$) and the abscissa the ratio (parts by weight) of each binder based on 100 parts by weight of graphite. It is understood from the FIGURE that the negative electrodes of the batteries according to the present invention have larger peeling strength compared with the negative electrode of the comparison battery. This means that the negative electrodes of the batteries of the present invention are superior to that of the comparison battery in bonding of graphite particles with each other and in adhesiveness between the binder and the collector metal.

It is also understood from Table 1 that the negative electrodes of the batteries of the present invention have smaller surface resistance than that of the negative electrode of the comparison battery, thereby being superior in conductivity.

Relationship between the amount of binder and the discharge capacity

There was studied how the discharge capacity of negative electrodes changed as the ratio between graphite and PI was changed. The results are shown in FIG. 3.

Figure 3:
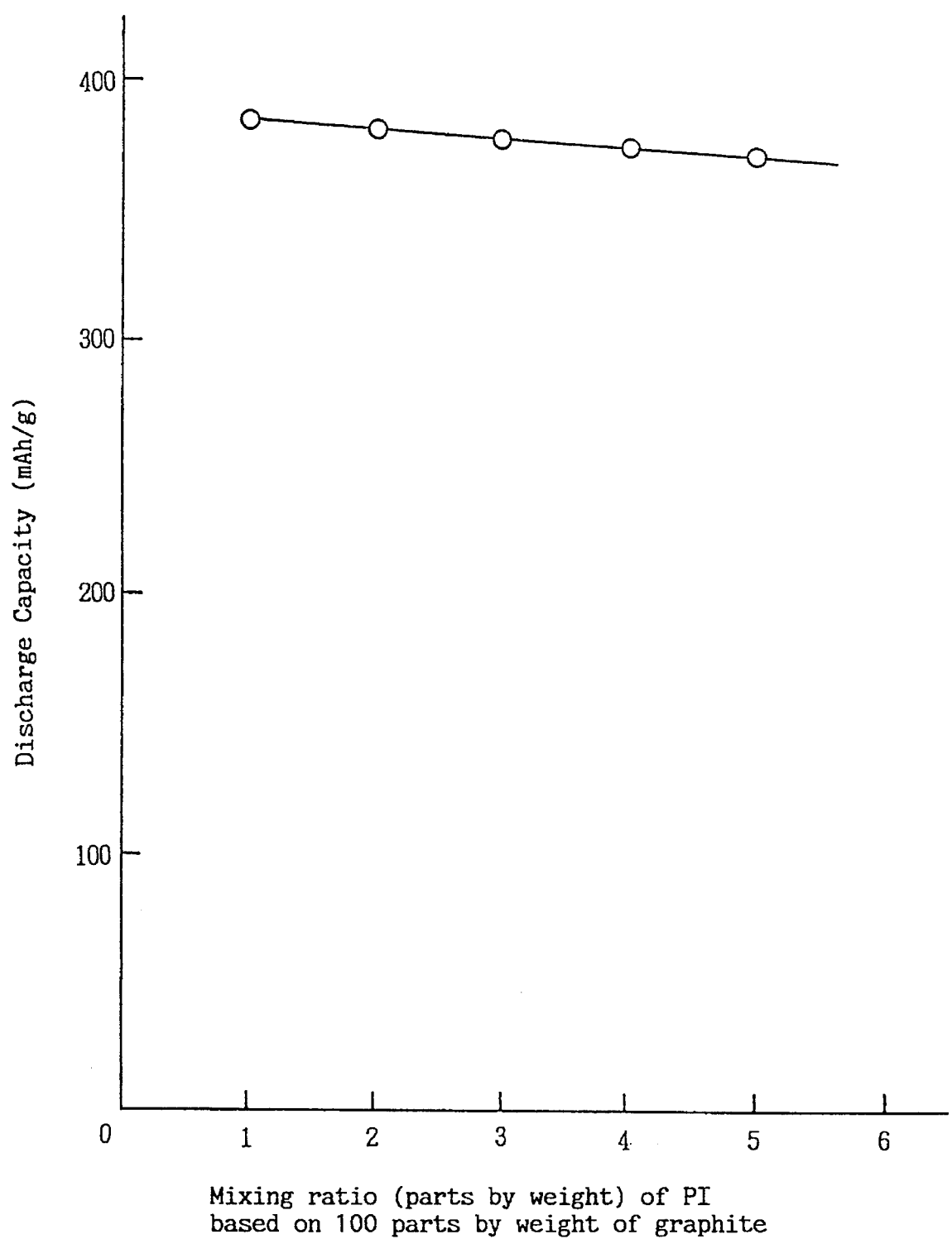
FIG. 3 is a graph showing the relationship between the amount of the binder (PI) and the discharge capacity of the negative electrode in the battery No. 1.

FIG. 3 is a graph with the ordinate representing the discharge capacity (mAh/g) of negative electrodes and the abscissa representing the parts by weight of PI based on 100 parts by weight of graphite. From the FIGURE it is understood that the discharge capacity decreases a little as the amount of PI increases.

Cycle characteristics of the batteries

The batteries prepared in Examples 1 and 2 and Comparative Example 1 were subjected to a cycle test to study their cycle characteristics, the cycle test comprising charging with a charge current of 60 mA to a charge termination voltage of 4.2 V and then discharging with a discharge current of 200 mA to a discharge termination voltage of 2.5 V. The results are shown in FIG. 4.

FIG. 4 is a graph showing the cycle characteristics of the batteries with the ordinate representing the discharge capacity of the negative electrodes and the abscissa the number of cycles (times). As seen from the FIGURE, the batteries of the present invention BA1 and BA2 utilizing a binder of PI and PVF, respectively, having good bonding among carbon particles and good adhesiveness between the carbon particles and the collector metal, showed no decrease at all in the service capacity after completion of 1000 cycles, while the comparison battery BC1 decreases its discharge capacity with increasing number of cycles and finally down to not more than 200 mAh/g at the 1000-th cycle. This is because little of the electrode material of the batteries of the present invention peels off even after repeated charge-discharge cycles, while the amount of carbon particles peeled off of the comparison battery BC1 increases with increasing number of cycles.

Safety test

An electrolyte solution was prepared by dissolving LiPF$_6$ in a concentration of 1 mole/liter in a 1/1 by volume mixed solvent of ethylene carbonate and dimethyl carbonate. The electrolyte solution thus prepared was placed in AA-size battery cans. Each of the negative electrodes prepared in Examples 1 and 2 and Comparative Example 1 was immersed in the solution and the cans were sealed. The cans were placed in an oven and subjected to a simple test for safety by heating from room temperature up to 200° C.

The battery cans containing the negative electrodes of the batteries BA1 and BA2 of the present invention showed no change at all even at a temperature of 200° C., while that containing the negative electrode of the comparison battery BC1 broke at 150° C. with its cap blown off due to increase of internal pressure.

This test shows that the batteries BA1 and BA2 of the present invention have high safety, while the comparison battery BC1 has problem in safety because it may break or burst upon abnormal elevation of battery temperature.

Although cylindrical batteries have been specifically described in the above Examples, the present invention can apply to batteries of any other shape, such as flat or square, with no particular limitation.

Obviously, numerous modifications and variations of the present invention are possible in light of the above teachings. It is therefore to be understood that within the scope of the appended claims, the invention may be practiced otherwise than as specifically described herein.

What is claimed is:

1. A secondary battery with a negative electrode consisting essentially of an electrode collector metal and a carbon powder capable of occluding and discharging cations, particles constituting said carbon powder being consolidated and adhered to said collector metal with a binder, said binder consisting essentially of a polyimide resin.

2. The secondary battery according to claim 1, wherein said polyimide resin is used in an amount of 0.5 to 2 parts by weight based on 100 parts by weight of said carbon powder.

3. A secondary battery with a negative electrode comprising a carbon powder capable of occluding and discharging cations, particles constituting said powder being consolidated with a binder, said binder consisting essentially of a polyvinyl formal resin.

4. The secondary battery according to claim 3, wherein said polyvinyl formal resin is used in an amount of 5 to 10 parts by weight based on 100 parts by weight of said carbon powder.

* * * * *